Figure 1:
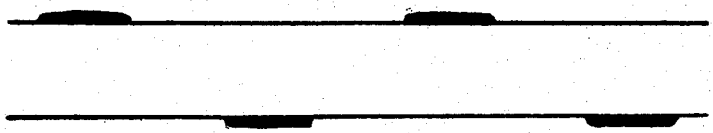

United States Patent [19]

Danielsson

[11] Patent Number: 4,467,008

[45] Date of Patent: Aug. 21, 1984

[54] FRICTIONAL ELEMENT

[75] Inventor: Mats P. A. Danielsson, Sandviken, Sweden

[73] Assignee: Santrade Ltd., Lucerne, Switzerland

[21] Appl. No.: 482,514

[22] PCT Filed: Sep. 19, 1980

[86] PCT No.: PCT/SE80/00225

§ 371 Date: Dec. 16, 1980

§ 102(e) Date: Dec. 16, 1980

[87] PCT Pub. No.: WO81/00894

PCT Pub. Date: Apr. 2, 1981

Related U.S. Application Data

[63] Continuation of Ser. No. 220,062, Dec. 16, 1980, abandoned.

[30] Foreign Application Priority Data

Sep. 21, 1979 [SE] Sweden ................................. 7907824

[51] Int. Cl.³ ............................ B32B 3/00; B32B 3/30
[52] U.S. Cl. .................................... 428/156; 428/179;
428/332; 428/600

[58] Field of Search ............... 428/141, 156, 174, 179,
428/323, 600, 614, 612, 332; 156/625, 654, 664,
659.1; 427/199, 210, 287

[56] References Cited

U.S. PATENT DOCUMENTS

| 2,099,273 | 11/1937 | Myer | 52/DIG. 6 |
|---|---|---|---|
| 2,811,108 | 6/1941 | Whalen | |
| 3,961,104 | 6/1976 | Tanner | 427/199 |
| 4,264,410 | 4/1981 | Frantzen | 156/654 |
| 4,268,564 | 5/1981 | Narashiman | 428/323 |

FOREIGN PATENT DOCUMENTS

| 1933089 | 1/1971 | Fed. Rep. of Germany . |
| 2811108 | 9/1979 | Fed. Rep. of Germany . |
| 215367 | 9/1967 | Sweden . |

Primary Examiner—Paul J. Thibodeau
Attorney, Agent, or Firm—Burns, Doane, Swecker & Mathis

[57] ABSTRACT

This invention relates to a frictional element that shall prevent relative-movement between construction parts and comprises a metallic plate with projecting teeth.

8 Claims, 3 Drawing Figures

FRICTIONAL ELEMENT

This application is a continuation of application Ser. No. 220,062 filed Dec. 16, 1980.

It is previously known to increase the stiffness in wood constructions joined together by bolts by inserting metallic elements between the wood parts, which elements on both sides are provided with a plurality of points, which are forced into the wood parts to a considerable depth. Elements of this type are not suitable for demountable constructions, since the surfaces of the construction parts are damaged by repeated demounting. The mentioned elements can neither be used for constructions of material having hard surfaces, which cannot be penetrated by the points, as for instance metals, or materials which should be subjected to cracks or burstings when penetrated by the points, as for instance hard plastic materials and ceramic materials. For such constructions it is previously known to use metallic elements which are bent in such a way at their periphery or at the edge of apertures being punched out that the bent parts form resilient tongues. When the construction parts are forced against each other, the corners or the edges of the resilient tongues are pressing against the construction parts with a force dependent on the stiffness of the tongues. These elements, however, do not function very well for hard construction parts, since said tongues only rest against the construction parts without penetrating the same. Therefore, there has been a strong desire in the market for an element, which shall hold not only construction parts made of soft material, as for instance wood, but especially construction parts made of hard material, as for instance steel.

The present invention is intended to satisfy these desires and hereafter shall be described more closely.

The invention constitutes a frictional element, which is produced by etching thin strips or sheets of material, which is hardened or is capable of being hardened. In this connection the production occurs in the following way (FIGS. 1-3).

Figure 2:
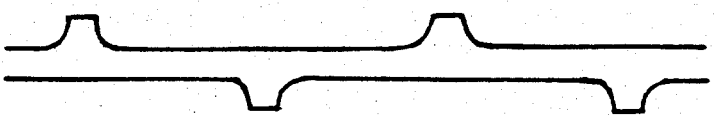

A strip 1 is on both sides covered by "screen-printing", another printing method or in a photographic way with a colour according to a certain pattern, which colour prevents etching, the patterns being so adapted that a covered area 2 on one side always corresponds to an uncovered area on the other side (FIG. 1). The strip is etched on both sides by spraying with or immersion into an etching liquid, for instance ferrous chloride dissolved in water, the surface layer of the strip being removed in the areas that are not covered by colour. The etching depth is made equal on both sides of the strip by symmetrical arrangement of the etching device or by adapting the conditions of spraying. A certain etching occurs also under the colour on the covered parts, the width of which shall be so large that parts of the original surface of the strip remain after etching, undercut, flat pointed teeth 3 or teeth having the form of flat pointed cones, wedges or pyramids being received. After the etching the colour layer is removed, whereafter frictional elements of desired form can be cut or punched out from the strip (FIG. 2). These frictional elements, if wished, can be given an increased hardness by hardening, chromium-plating or another hard metallic layer.

Figure 3:
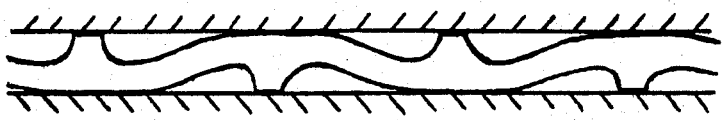

When applying an element between two construction parts 4, 5, which are forced together against flat outer faces 8 of the teeth 3, the thin part or deformation section 6 of the element will be bent so that the compressive force against every standing pattern detail is distributed over a substantially larger, smooth surface portion 7 on the opposite side of the strip (FIG. 3). Due to that fact considerable shearing forces can be transmitted without giving dangerous concentrations of flexural tensions in the frictional element and with a minimal mutual movement between the construction parts.

The frictional element has the following advantages in relation to previously known technics:

1. The points can be very closely located so that the power transmission is distributed on a large number of points, the penetrating depth of which can be made small. Due to that fact the damages on the surfaces of the construction elements can be reduced so that the joint can be demounted and put together repeated times without impaired function.

2. The frictional element can be given a small and well-defined thickness so that the finished construction can be formed with well-defined measures, which are not influenced by the size of the tightening of bolts or other elements for forcing the parts of the construction together.

3. The points of the frictional element can be made so hard and so sharp that with a small penetrating depth they can transmit large forces to the construction parts of metallic materials as for instance unhardened steel.

4. The frictional element can be made as large, flexible pieces, which can be formed on the basis of the surfaces of the adjacent construction parts.

The tooth height is not more than 2 mm and preferably less than 1 mm for the two embodiments. It has turned out that a tooth height that is larger or equal to 0.2 mm but less or equal to 0.4 mm is particularly advantageous.

The frictional element is preferably provided with teeth on both surfaces that rest against the parts, which shall be prevented to move relative to each other.

The invention is particularly suitable to use separately or together with a screw joint within building industry, vehicle industry and engineering industry.

The construction parts mentioned in the application comprise elements, which shall be prevented to slide relative to each other, as for instance beams of different kinds, parts in vehicles as for instance engine and chassis, and parts in machines as for instance a stand for a crane or another equipment and a plate or another bed in the machine, which stand shall be fastened on to the plate.

I claim:

1. A frictional element sized to be positioned between relatively immovable construction members such that opposite sides of the frictional element frictionally engage respective ones of the construction members to resist relative movement between the construction members, said element comprising a sheet and a plurality of outwardly projecting teeth disposed on both sides of said sheet, said teeth having substantially flat outer faces, the teeth on one side of said sheet being off-set from the nearest teeth on the other side, the spacing between such offset teeth being sufficient to render the portion of the sheet between such offset teeth deformable.

2. A frictional element according to claim 1, wherein the height of said teeth is no greater than 2 mm.

3. A frictional element according to claim 2, wherein the height of said teeth is less than 1 mm.

4. A frictional element according to claim 3, wherein the height of said teeth is from 0.2 to 0.4 mm.

5. A frictional element according to claim 1, wherein said teeth are shaped as truncated cones.

6. A frictional element according to claim 1, wherein said teeth are shaped as truncated pyramids.

7. A frictional element according to claim 1, wherein said teeth are strength-hardened.

8. A frictional element according to claim 1, wherein said teeth contain a hard metallic layer.

* * * * *